United States Patent [19]

Edwards

[11] Patent Number: 4,534,849
[45] Date of Patent: Aug. 13, 1985

[54] METHOD FOR ABOVEGROUND SEPARATION, VAPORIZATION AND RECOVERY OF OIL FROM OIL SHALE

[75] Inventor: Ray C. Edwards, Kinnelon, N.J.

[73] Assignee: Edwards Engineering Corporation, Pompton Plains, N.J.

[21] Appl. No.: 642,084

[22] Filed: Aug. 20, 1984

Related U.S. Application Data

[60] Continuation-in-part of Ser. No. 508,738, Jun. 29, 1983, abandoned, Division of Ser. No. 457,975, Jan. 14, 1983, Pat. No. 4,502,920.

[51] Int. Cl.$^3$ .......................... C10G 1/02; C10G 1/00
[52] U.S. Cl. .................... 208/11 R; 208/8 R; 201/34
[58] Field of Search ............. 208/8 R, 11 R, DIG. 1; 201/34

[56] References Cited

U.S. PATENT DOCUMENTS

| | | | |
|---|---|---|---|
| 2,448,223 | 8/1948 | Lantz | 208/11 R |
| 2,581,041 | 1/1952 | Ogorzaly et al. | 208/11 R |
| 2,698,283 | 12/1954 | Dalin | 208/11 R |
| 2,710,828 | 6/1955 | Scott, Jr. | 208/11 R |
| 2,814,587 | 11/1957 | Van Dijck | 208/11 R |
| 3,377,266 | 4/1968 | Sulnikov | 208/11 R |
| 3,384,569 | 5/1968 | Peet | 208/11 R |
| 4,056,461 | 11/1977 | Unverferth | 208/8 R |
| 4,082,645 | 4/1978 | Knight et al. | 201/32 |

*Primary Examiner*—D. E. Gantz
*Assistant Examiner*—Chung K. Pak
*Attorney, Agent, or Firm*—Daniel H. Bobis

[57] ABSTRACT

An improved retort process in which oil is recovered from crushed oil shale moved by gravity through a passageway of an elongated housing with an inlet for the crushed oil shale at the top end and an outlet for the spent crushed oil shale at the bottom end of the housing, with the rate of movement of the crushed oil shale through the passageway in the housing being controlled. Heat is transferred in sequence to or from the ground oil shale as it moves from the inlet to the outlet by means of heat exchangers which are spaced to define a drying zone, a preheating zone, a cracking and distillation zone. Waste heat recovered from the waste heat recovery zone is passed to the preheating zone. Sufficient heat is delivered to the cracking and distillation zone to raise the temperature of the crushed oil shale moving through the cracking and distillation zone to the critical temperature for separating hydrocarbons in vapor form therefrom by means of an auxiliary heating assembly. The mixture of hydrocarbon vapors and gases released from the moving and heated crushed oil shale is withdrawn by a separating device, which condenses and removes hydrocarbons from the mixture. Additionally, a predetermined operating pressure is maintained in the respective preheat zone and the waste heat recovery zone, and the pressure in the cracking and distillation zone is controlled in response to the pressures sensed in the other zones and greater than such pressures.

8 Claims, 10 Drawing Figures

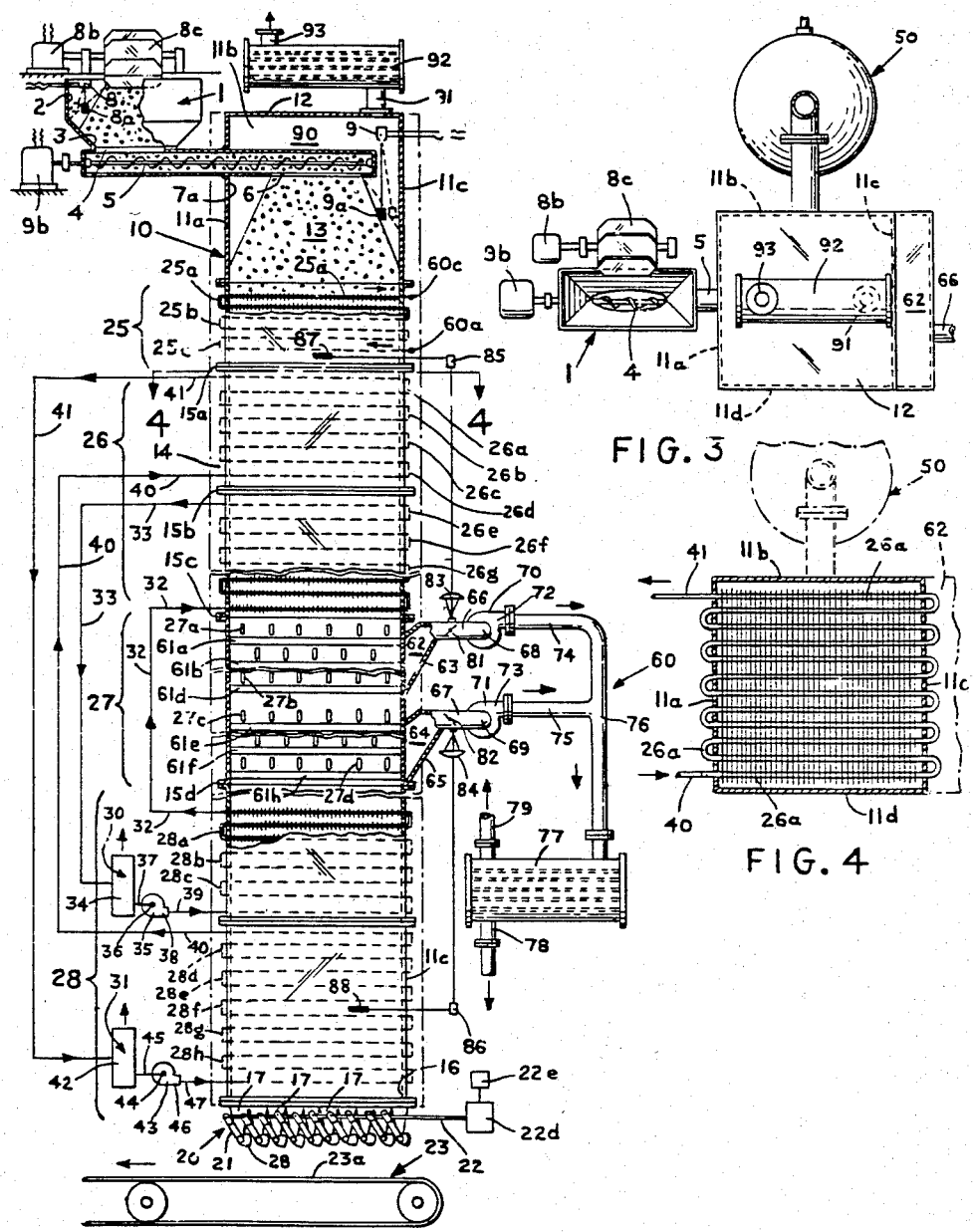

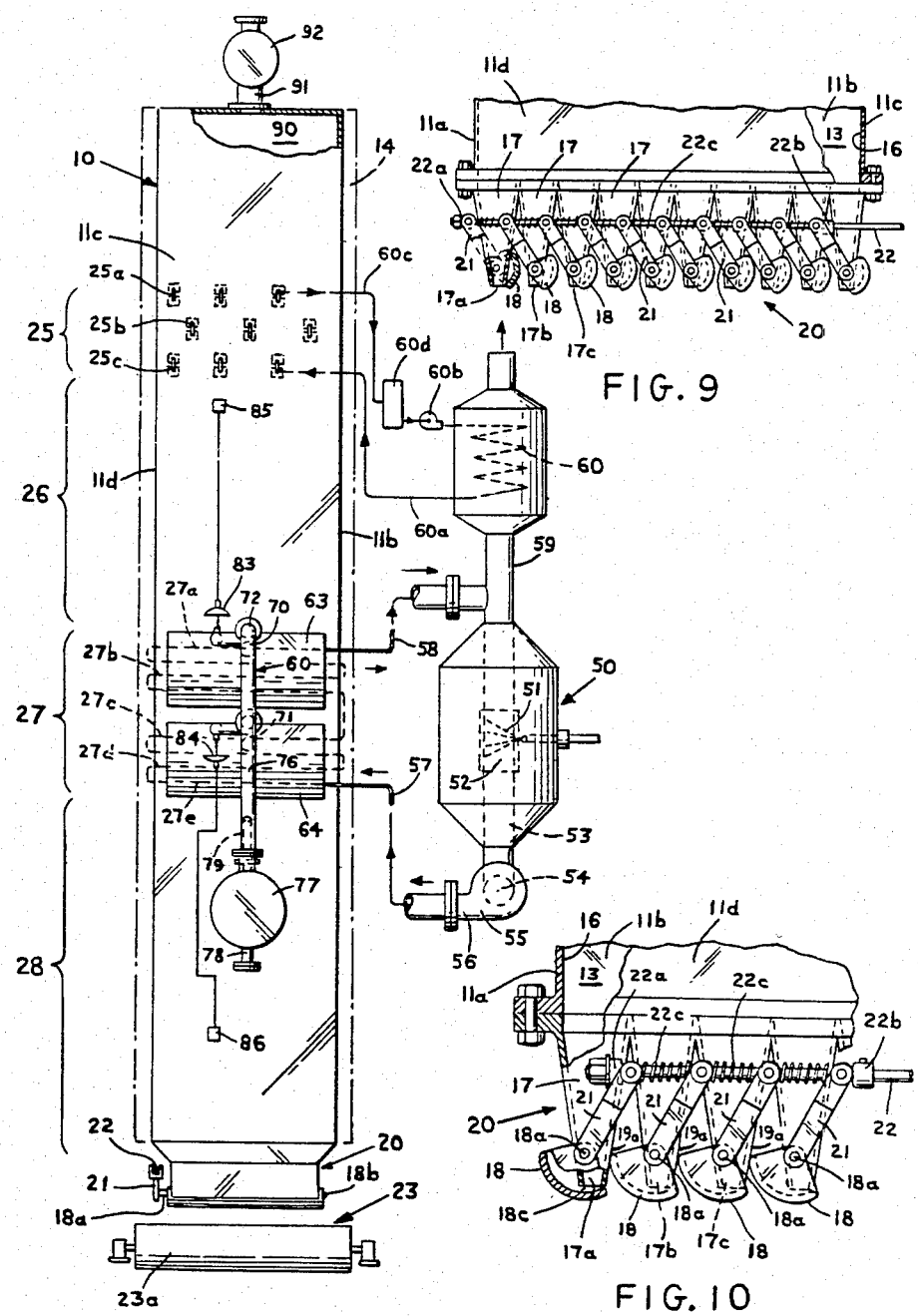

METHOD FOR ABOVEGROUND SEPARATION, VAPORIZATION AND RECOVERY OF OIL FROM OIL SHALE

REFERENCE TO RELATED APPLICATION

This application is a continuation-in-part of U.S. patent application Ser. No. 508,738, filed June 29, 1983, now abandoned, entitled Apparatus and Method for Aboveground Separation, Vaporization and Recovery of Oil from Oil Shale which, in turn, is a divisional application of U.S. patent application Ser. No. 457,975, filed Jan. 14, 1983, U.S. Pat. No. 4,502, 920 entitled Apparatus and Method for Aboveground Separation, Vaporization and Recovery of Oil from Oil Shale.

BACKGROUND OF THE INVENTION

This invention relates generally to a retorting type apparatus, process and system for aboveground recovery of oil from oil shale and more particularly to an anaerobic retorting apparatus, process and system for separating, vaporizing and recovering oil and gas from crushed oil shale.

Many aboveground retorting processes are known in the prior art. Only a few of these retorting apparatus, processes and systems however have been constructed and studied for the purpose of developing an apparatus and system suitable for handling the recovery of oil from the large quantities of oil shale material that must be handled to meet the modern requirements for an efficient workable, and feasible system.

Those skilled in the art will recognize that a technically and economically feasible retorting apparatus, process and system must be capable of thermally degrading the solid organic material (kerogen) in the shale. Thus, such retorting apparatus, processes and systems must be capable of heating the oil shale to 800°–1100° F. (425°–600° C.), to decompose the kerogen into the oil and gaseous components so that these components can be separated and recovered from the base material of the shale.

Various types of apparatus and systems for aboveground retorting processes for removing oil and gas from oil shale have been designed, developed and tested in the United States. These are generally identified as the Gas Retorting System, and the Tosco II Retorting System. The apparatus and system for these prior art processes and the respective pros and cons thereof are outlined in depth at Chapter 9 entitled Retorting Technology of Oil Shale by Gerald U. Dinneen in the publication, Developments in Petroleum Science, 5; Oil Shale edited by T. F. Yen and G. V. Chilingarian published in 1976 by American Elsevier Scientific Publishing Company, New York, New York 10017.

In Brazil, Petrobras, a Brazilian Government Corporation has developed an aboveground retorting process identified as the Petrosix process. In this Petrosix process a vertical retort tower is charged with ground oil shale which is moved by gravity from the top to the bottom thereof through heating, retorting, and cooling zones, in which a recycled gas stream entering at the bottom of the vertical retort tower recovers heat as it moves upwardly in a counter-flow direction to the downwardly moving oil shale until it reaches an intermediate or medial section of the vertical retort tower where it combines with heated retort gas for providing the necessary heat to raise the temperature of the downwardly moving oil shale to the required decomposition temperatures for separating and vaporizing oil and gas from the oil shale. The entire mixture of recycled and heated gases, separated and vaporized oil, all move upwardly in counter-flow to the entering oil shale and pass from a suitable outlet or discharge port at the upper end of the vertical retort tower. The mixture is then passed to means for separating the product oil and product gas. A portion of the product gas is recycled for reuse in the vertical retort tower. This process is characterized by the use of an external heat source and by direct heat exchange between the solid oil shale and the upflowing gaseous heat exchange medium which is used to establish the temperature required for decomposition of the organic matter in the downwardly moving oil shale in the vertical retort tower.

The following U.S. patents were cited in related U.S. patent application Ser. No. 508,738, filed June 29, 1983, which, in turn, is a divisional application of the aforementioned U.S. patent application Ser. No. 457,975: U.S. Pat. No. 2,448,223 to Lantz; U.S. Pat. No. 2,581,041 to Ogorzaly et al; U.S. Pat. No. 2,698,283 to Dalin, U.S. Pat. No. 2,710,828 to Scott, Jr.; U.S. Pat. No. 3,384,569 to Peet; U.S. Pat. No. 3,377,266 to Salnikov; and U.S. Pat. No. 4,056,461 to Unverferth. The relevance of these references is discussed in the aforementioned U.S. patent application Ser. No. 508,738.

A problem that may result in prior art system due to improper pressure differentials is that the vaporized kerogen and components thereof may condense in the tower before being drawn off. This, of course, causes problems in the flow of material through the tower and may even be dangerous.

The present invention provides an improved retorting process in which an elongated tower defines a passage means for passing by gravitational movement crushed oil shale fragments generally in a size range not in excess of ¾", through drying, preheating, cracking and distillation, and waste heat recovery zones formed in the elongated tower. These zones are established and characterized by indirect heat exchange means. The waste heat from the waste heat recovery zone is recovered and passed to both the cracking and distillation zone and preheat recovery zone. A separate externally heated gas stream or heat transfer fluid provides the heat exchange medium for the heating of the oil shale during its gravitational movement through the cracking and distillation zone. In the cracking and distillation zone, the preheated oil shale is raised to the required temperature for the decomposition of the kerogen organic matter. In the decomposed state the kerogen is vaporized and the hydrocarbon and gaseous components of the kerogen are, in the vapor state, readily separated from the gravitational moving crushed oil shale in the elongated housing or recovery tower. This separation process is controlled by maintaining atmospheric pressure in the elongated housing or recovery tower at two locations. Location No. 1 may be in the drying zone or the preheat zone. This will permit water vapor to exit from the top of the elongated housing or recovery tower. Location No. 2 is a predetermined distance from the discharge outlet for spent oil shale. By maintaining the pressure conditions in the elongated housing or recovery tower at atmospheric pressure, the decomposed kerogen vapors can be drawn off or will exit under pressure automatically from the cracking or distillation zone.

By this means the cracking and distillation zone will be at a pressure above atmospheric pressure and will operate in an ambient atmosphere substantially lacking in oxygen.

SUMMARY OF THE INVENTION

Thus the present invention covers an improved retort apparatus for recovering hydrocarbons from crushed oil shale having, an elongated housing with an inlet for crushed shale at one end, an outlet for spent crushed shale at the end of the housing remote from the inlet end, and a passage end to end therethrough enables the crushed oil shale to move from the inlet to the outlet. A plurality of heat exchange means connected in the housing for heat exchange relation with the crushed oil shale moving through the passage means are disposed serially between the inlet and the outlet to define, a drying zone, a preheating zone, a cracking and distillation zone, and a waste heat recovery zone. Circulating means is provided for passing waste heat recovered from the waste heat recovery zone to the preheating zone, and an auxiliary heating means connected to one of the plurality of heat exchanger means disposed in the cracking and distillation zone delivers heat sufficient to raise the temperature of the crushed oil shale moving through the passage means to the critical temperature for separating hydrocarbons in vapor form from the crushed oil shale. Separating means including a condenser operatively connected with the cracking and distillation zone acts to withdraw a mixture of hydrocarbon and gas vapors released from the heated crushed oil shale moving through the cracking and distillation zone, and to separate and recover the hydrocarbon therefrom, means connected for operative association with the outlet for the elongated housing controls the rate of movement of crushed oil shale through the passage means, and conveying means adjacent the outlet end of the elongated housing removes the spent oil shale discharged therefrom.

Additionally the retort apparatus as above described includes means for maintaining a predetermined operating pressure in the respective preheat zone and the waste heat recovery zone to prevent separated hydrocarbon and gas vapors from leaking to the atmosphere through either the inlet or the outlet for the elongated tower.

Further, the retort apparatus as described above includes means for sensing the pressures in the zones surrounding the cracking and distillation zone, and means for adjusting the pressure in the cracking and distillation zone in response to the sensed pressures and greater than the pressures in the other zones.

Additionally the retort apparatus as described above, includes means for venting hot gases from the auxiliary heating means for heating the cracking and distillation zone, and means connecting the one of the plurality of heat exchange means in the drying section to the means for venting the waste hot gases from the auxiliary heating means for drying the crushed oil shale entering the passage means in the elongated housing.

Accordingly it is an object of the present invention to provide an improved retort apparatus for separating hydrocarbon from oil shale.

Another object of the present invention is to provide an improved retort apparatus for separating hydrocarbons from oil shale in which the system is, bootstrapped, by recovering waste heat from spent oil shale and using waste heat from the cracking and distillation zone of the apparatus to preheat oil shale entering the system for retort treatment.

Another object of the present invention is to provide an improved retort apparatus for separating hydrocarbons from oil shale which includes, a control system to regulate the upper internal vapor pressure and lower internal vapor pressure of the retort apparatus thereby preventing the escape of significant quantities of hydrocarbon vapors which have been separated from the oil shale during retort treatment and at the same time preventing the contamination of the recovered hydrocarbon vapors with air which consists primarily of nitrogen, oxygen, and $CO_2$.

Another object of this invention is to provide an improved retort apparatus for separating hydrocarbons from oil shale, in which a cracking and distillation zone is constructed in such a manner that the temperature of the oil shale can be raised by means of an auxiliary heat source to a desired, necessary critical temperature sufficient to separate hydrocarbons in the vapor state from the organic matter in the oil shale while the oil shale is moving by gravitational force through the apparatus.

It is a still further object of the present invention to provide an improved retort apparatus for separating hydrocarbons from crushed oil shale in which an auxiliary heat source is utilized for raising the oil shale in the cracking and distillation zone to the critical temperature for separating the hydrocarbons in vapor form from the organic matter during gravitation movement of the crushed oil shale, and a separating means is disposed in communication with the cracking and distillation zone for withdrawing the hydrocarbon vapors formed therein as a function of the pressure in the cracking and distillation zone and in the respective zones on opposite sides of the cracking and distillation zone in the retort apparatus.

With these and other objects in view the invention will be better understood by reference to the attached description of the apparatus and system in accordance with the present invention taken along with the Figures of the drawings.

DESCRIPTION OF THE FIGURES

FIG. 1 is a schematic front view of one form of retort apparatus and system for recovery of hydrocarbons from oil shale in accordance with the present invention.

FIG. 2 is a schematic view of the form of the invention shown in FIG. 1 turned 90°.

FIG. 3 is a top view of the apparatus and system shown in FIG. 1.

FIG. 4 is a cross-section taken on line 4—4 of FIG. 1.

FIG. 9 is an enlarged side view of the control assembly for opening and closing the outlet end of the retort apparatus shown in FIGS. 1, 2 and 5 of the drawings, shown in the open position.

FIG. 10 is a fragmentary enlarged view of the control assembly shown in FIG. 9 showing the outlet port closure members in the closed position.

DESCRIPTION OF THE PREFERRED EMBODIMENT

Figure 5:
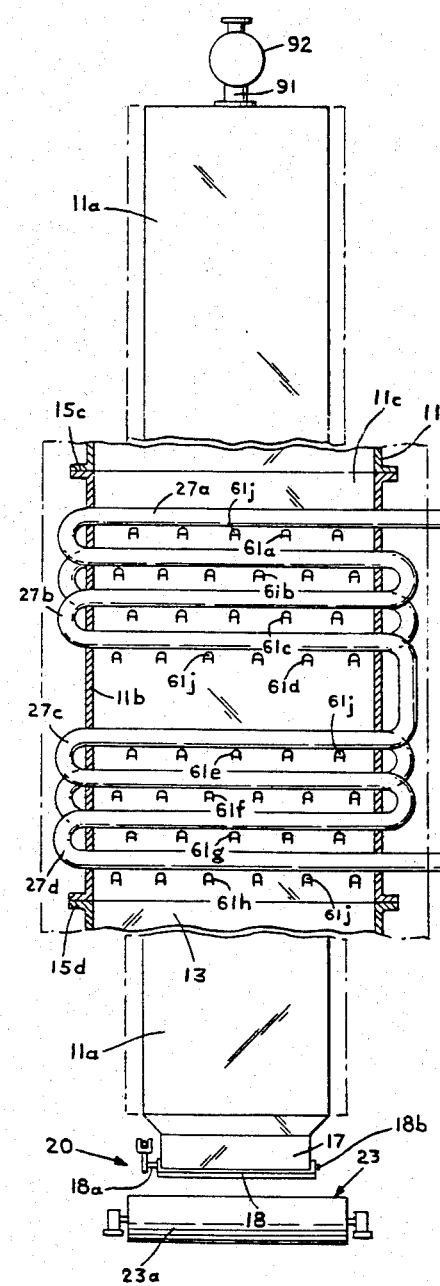
FIG. 5 is a schematic view of the apparatus and system shown in FIGS. 1 and 2 with the cracking and distillation zone enlarged to more clearly show the elements and structure operatively associated with the auxiliary heating means and the portions and elements therein associated with the separating means for withdrawing hydrocarbon vapors released from the oil shale moving through the cracking and distillation zone in the apparatus.

Referring to the drawings FIGS. 1 to 10 show one preferred retort apparatus and system in accordance with the present invention, for separating, vaporizing and recovering hydrocarbons from oil bearing ores such as oil bearing shales.

The system includes a storage hopper generally designated 1 from which crushed oil bearing shales are fed to the system. The oil bearing shales will be crushed by any suitable means such as a jaw crusher (not shown) to less than $\frac{3}{4}''$ in size before they are delivered to the storage hopper. This size for the oil bearing shale has been found suitable for use in the elongated housing or recovery tower generally designated 10 and more fully described hereinafter. However, if possible it is preferred to reduce the oil bearing shales to a size from small particles to less than $\frac{1}{2}''$ or in a range of sizes less than $\frac{1}{2}''$. Those skilled in the art will recognize that reducing the size of the oil shale is not only to increase the amount of surface that can be treated in the elongated housing or recovery tower 10 but in addition to aid or to favor gravity flow movmeent of the oil shale through the apparatus.

With a jaw crusher, approximately one-sixth of the crushed oil shale will be made of fines. The use of crushed oil shale is preferable to ground oil shale which contains approximately 50% fines, and which results in a health hazard from fines in the atmosphere and a danger to the operation of the machinery. It is, however, important that some fines be included as part of the oil shale, since fines prevent channeling of air through the apparatus and thereby keeps air out if the pressure drops. Accordingly, the present invention is particularly suited for operation with crushed oil shale.

The storage hopper 1 has a storage hopper inlet opening as at 2 for receiving the crushed or broken oil shale and a hopper outlet 3 at the lower end thereof communicates with screw conveyor inlet 4 on the screw conveyor 5 connected to the storage hopper 1 about the hopper outlet 3. Screw conveyor 5 is a device for longitudinally transferring crushed solids and there are many conventional designs for this purpose easily purchaseable on the open market. Therefore this device will not be more fully described herein.

The screw conveyor 5 at the end remote from the screw conveyor inlet 4 is provided with a screw conveyor outlet 6 disposed to deliver the crushed oil shale to the upper or inlet end 7 of the elongated housing or recovery tower 10.

In the hopper 1 a control assembly 8 is connected with a sensing arm 8a which responds to the level of the crushed or broken oil shale in the hopper to signal operation of the motor 8b for driving the conveying bucket assembly 8c to supply crushed oil shale in accordance with the level of crushed oil shale in the hopper 1.

Similarly in the upper end 7 of the elongated housing or recovery tower 10, a similar control assembly 9 is connected with a sensing arm 9a which responds to the level of the crushed or broken oil shale in the upper end of the housing or tower 10 to signal operation of the motor 9b for driving the screw conveyor 5 to deliver the crushed or broken oil shale through the opening 6 into the upper end 7 of the housing or tower 10.

The movement of the crushed oil shale through the housing or tower 10 will be regulated and controlled by an outlet or exit control assembly generally designated 20 more fully described below. However, it is thought to be clear that the respective delivery of crushed oil shale to the upper end 7 of the housing or tower 10 and into the hopper 1 will be a function of and are operatively related to the movement of the crushed oil shale as regulated and controlled by the outlet or exit control assembly 20.

ELONGATED HOUSING OR RECOVERY TOWER

The elongated housing 10 includes side walls as at 11a, 11b, 11c and 11d and a top or cover member 12. The side walls 11a, 11b, 11c and 11d are shaped and sized preferably square in cross-section and define from the inlet or upper end to the outlet or lower end thereof a transfer passage 13 for crushed oil shale.

The elongated tower side walls are made of conventional steel and the walls may be insulated as shown by the phantomized lines 15 to conserve heat loss therethrough.

The side walls may be built in sections and joined by suitable flange means as at 15a, 15b, 15c and 15d etc. to permit the sections to be bolted, welded or otherwise joined together in any conventional manner, as will be understood by those skilled in the art.

As is shown in FIGS. 1, 2, 5, 9 and 10 the end of the elongated housing or recovery tower 10 is provided with an outlet 16 which is in turn communicated with a plurality of elongated cone shaped outlet port members 17 respectively provided with outlet ports as at 17a, 17b and 17c etc. as shown in FIGS. 9 and 10.

Thus crushed oil shale will pass from the outlet 16 through the outlet port members 17 to the outlet ports 17a, 17b, 17c, etc.

Discharge of the crushed oil shale from each of the outlet ports 17a, 17b, 17c, etc. is controlled by an elongated arcuate shaped member or closure head 18 which is pivotally connected as at 18a and 18b on opposite ends of each respective outlet port member 17 so that the arcuate shaped member or closure head 18 may be pivoted to the open position shown in FIG. 9 from the normally closed position shown in FIG. 10.

It is particularly noted that the arcuate shape of the member or closure head 18 is so designed that in the closed position as shown in FIG. 10 there will be a clearance as at 18c between the outlet ports 17a, 17b, 17c etc., and the inner arcuate face of the respective arcuate members on closure heads 18 as is shown in FIG. 10. This arrangement in the closed position permits the crushed oil shale to compress between the outlet ports 17a, 17b, 17c, etc., and the inner face of the closure heads 18 without spilling over and enables the closure heads 18 on opening movement to wipe the outlet port clear so that the crushed oil shale will move freely from the outlet ports 17a, 17b, 17c, etc., when the closure head is in the open position.

Further, the arcuate shape of the closure heads 18 are so defined with respect to the pivotal point 18a that automatic stop limits are provided for the closure heads 18. Thus, on the closing movement one end of the closure head 18 will contact the outer wall 19a of the next adjacent outlet port member and on opening movement thereof the opposite end will contact the same outer wall of the outlet port member on which it is pivotally connected as is shown at FIGS. 9 and 10 of the drawings.

The operation or movement of the arcuate members or closure heads 18 are controlled by the outlet control assembly 20 which includes lever arms 21 connected at one end to the arcuate members or closure heads 18 and at the opposite end to an actuating rod assembly 22.

Any suitable type of pivotal arrangement can be used for this purpose. In the arrangement shown the lever arms 21 are pivotally connected at both ends. Between the actuating rod assembly collars 22a and 22b springs 22c are disposed between the pivoted end connections for the lever arm 22.

The actuating rod assembly 22 is moved by a suitable motor 22d which is in turn operated by signals from a timer 22e so that the actuating rod assembly will move in one direction to maintain the closure head 18 in the closed position as shown in FIG. 10 for about 10 seconds and then in the opposite direction to the open position shown in FIG. 9 where it will remain for about 5 seconds.

During the period when the closurse head is in the open position, crushed and broken oil shale will discharge from the outlet ports 17a, 17b, 17c, etc. onto the belt 23a of any suitable type of conveying assembly generally designated 23.

Conveying assemblies for removing solid material are well known in the art and accordingly will not be more fully described.

The need for regulating and controlling the gravitional movement of the crushed or broken oil shale through the passage 13 in the elongated housing or recovery tower 10 is to permit the desired dwell time in the various operatively associated heat exchange zones which are established in the elongated recovery tower 10 so that the optimum recovery of hydrocarbon vapors from the crushed oil shale will be effected to provide an efficient oil recovery apparatus and system.

Thus, elongated recovery housing 10 and the transfer passage 13 formed therein are divided into four operatively associated zones hereinafter more fully delineated for treating the crushed oil shale as it moves gravitationally downward through the transfer passage 13. These zones are established by heat exchangers which are connected serially in the elongated housing so as to extend transversely of the transfer passage 13 in their respective zones.

Thus, in accordance with the method and process of the present system the crushed oil shale is first passed through drying zone 25 to substantially drive off or separate water in vapor form and non-condensible gases. Adjacent to and following the drying zone is a preheat zone 26 where the temperature of the crushed oil shale is raised to about 800°–825° F. (425°–475° C.).

The upper or preheating zone 26 extends from the drying zone in the elongated housing 11 to an intermediate or cracking and distillation zone 27 in the medial section of the transfer passage 13 in the elongated housing 10. In the cracking and distillation zone the temperature of the crushed oil shale is raised to the critical temperatures for cracking or decomposing the organic matter or kerogen, about 800°–1100° F. (425°–600° C.) into hydrocarbon vapors so that suitable separating means can be provided to remove the vaporized hydrocarbons and condense the same to the liquid phase.

Associated with the upper or preheating zone 26 is the lower or waste heat recovery zone 28 which extends from the lower end of the cracking and distillation zone to the outlet control assembly 20 connected to the discharge outlet 16 for the elongated housing or elongated recovery tower 10.

The heat needed to drive off the water and non-condensible gases in the drying zone 25 is accomplished by heat exchange across the heat exchanger tubes 25a, 25b and 25c utilizing a gaseous heat exchange medium vented from an auxiliary heating unit 50 for the cracking and distillation zone 27 as is shown in FIGS. 1 and 2 of the drawings and more fully described below.

The delivery of heat to the crushed oil bearing shale in the preheating zone 26 is accomplished by heat exchange with suitable fluid circulated through heat exchange tube bundles as at 26a, 26b, 26c, 26d and 26e which are transversely and serially mounted in spaced and interconnected relationship along the vertical or longitudinal line of the preheating section 26 in the transfer passage 13 as is shown in FIGS. 1 and 4 of the drawings.

Similarly, the transfer or withdrawal of heat from the spent oil shale when it leaves the intermediate or cracking and distillation zone 27 and moves downwardly through the waste heat recovery section 28 is also accomplished by means of heat exchange wherein heat is delivered to fluid circulating through the heat exchange tube bundles as at 28a, 28b, 28c, 28d, 28e, 28f, 28g, 28h, 28i and 28j which are transversely and serially mounted in spaced and interconnecting relationship along the vertical or longitudinal line of the waste heat recovery section 28 of the transfer passage 13 in the elongated housing 10 as is also shown in FIG. 1 of the drawings.

The waste heat recovery zone 28 is brought into operative association with the preheating zone 26 so that the waste heat recovered in the waste heat recovery zone can be used to preheat the entering crushed oil shale by means of any suitable type of pumping circuits generally designated 30 and 31 which can be used to interconnect the respective heat exchange tube bundles 28a to 28g of the waste heat recovery zone 28 with the heat exchange tube bundles 26a to 26e of the preheating zone 26. Thus, when the pumping circuit is in operation the desired heat exchange fluid can be circulated from one zone to the other to recover the waste heat and thus increase the efficiency of this system.

Further however, it will be noted that the pumping circuit must be adapted to pump a fluid betwen the heat exchanger tubes in the waste heat recovery section and the preheating section to achieve the desired operating temperatures for the system. Thus fluids must be utilized in the pumping circuits 30 and 31 such as heat transfer oil or silicone fluid that can withstand the waste heat temperatures of 800°–825° F. (425°–475° C.).

Referring to FIG. 1, the pumping circuit 30 is shown to include a common delivery line manifold 32 and a common return line manifold 33. Delivery line 32 is connected to the upper end of the serially connected heat transfer tubes 28a to 28d of the waste heat recovery section and the opposite end of the common delivery line 32 is connected to the lower end of the serially connected heat exchange tube bundle 26d and 26e of the preheating section 15.

The upper end of the heat exchange tube bundle 26d and 26e is in turn connected to one end of the common return line 33, the remote end of which is connected to a storage and accumulator member 34 to provide a source of heat transfer oil for the circulating pump 35 for the pumping circuit 30. Pump 35 has its suction 36 connected as by suction line 37 to the lower end of the storage and accumulator chamber 34 and the discharge 38 is connected by line 39 to the lower end of the waste heat exchanger tubes 28a to 28d.

Similarly in the pumping circuit 31 the common delivery line 40 is connected at one end to the upper end of the serially connected waste heat exchanger tubes 28e to 28g and has its remote end connected to the lower end of the preheat exchanger tubes 26a to 26c. The upper end of the serially connected preheater zone heat exchange tubes 26a to 26c is connected to the common return line manifold 41 the opposite end of which is connected to the storage accumulator 42 for providing a source of silicone fluid for the circulating pump 43. Circulating pump 43 has its suction 44 connected by suction line 45 to the lower end of the silicone storage and accumulator 42 and its discharge 46 connected by line 47 to the lower end of the serially connected waste heat exchange tubes 28e to 28g.

When the system is in operation the circulating pumps 35 and 43 will be placed in operation so that the respective pumping circuits 30 and 31 can deliver the waste heat from the waste heat recovery zone to the preheat zone in the elongated housing or recovery tower 10 so as to preheat the gravitational moving oil shale by the recovered waste heat which is therefore not lost during the operation of the system thus increasing the efficiency of the system.

In the gravitational movement of the crushed oil shale through the transfer passage 13 the crushed oil shale moves from the preheating zone 26 into the intermediate cracking and distillation zone 27 where the temperature is raised also by a heat exchange mechanism hereinafter described as the critical temperature required to decompose the organic matter or kerogen and thus separate and vaporize the oil in the crushed oil shale as it moves through this cracking and distillation zone 27.

The heat exchange mechanism consists of a plurality of serially connected tube bundles as at 27a, 27b, 27c, in the upper or first section and 27d, 27e and 27f in the lower or second section of the cracking and distillation zone which are mounted on the elongated housing 10 transversely to the longitudinal line of the transfer passage 13. However it will be noted that the heat exchanger tubes 27a through 27f are disposed at 90° to the heat exchanger tubes for the respective drying zone 25, preheat recovery zone 26 and waste heat recovery zone 28 because this heat exchanger mechanism in the elongated or recovery tower 10 is connected to an auxiliary heat supply assembly generally designated 50 which is connected exterially of the wall means 11b as is shown in FIGS. 2 and 3 of the drawings. The position of such auxiliary heat assembly permits a suitable separation means generally designated 60 to be connected to the side wall 11c of the elongated housing or recovery tower 10 so as to communicate with the respective upper seciton and lower section of the cracking and distillation zone to withdraw released hydrocarbons and other gases from the cracking and distillation zone as will be more fully described below.

The auxiliary heating assembly 50 provides hot combustion gases as the heat exchange medium to be passed through the heat exchange mechanism in the upper section and lower section of the cracking and distillation zone 27 and such hot combustion gases may be obtained from any suitable source such as a gas or oil burner generally designated 51. Auxiliary heating assemblies of this type are well known. The gas or oil burner 51 has a combustion chamber 52 with a combustion gas outlet 53 connected to the suction inlet 54 of a blower 55. The discharge 56 of the blower communicates by auxiliary heat delivery line 57 to the lower end of the lower section of the cracking and distillation zone 27. Since the lower section is serially connected to the upper section, the combustion gases pass through the lower section and the upper section and exit through the delivery line 58 to a vent line 59. In the vent line 59, a heat exchange coil 60 is mounted in any suitable manner. Heat exchange coil 60 is connected by inlet line 60a to the lower end of the serially disposed heat exchanger tubes 25a, 25b, and 25c in the drying zone 25 so that a heat exchange medium such as water and glycol can be passed thereto by any suitable type of circulating pump 60b which takes its suction from the accumulator 60d communicating with the return line 60c for returning the heat exchange medium to the heat exchange unit 60. Thus, waste heat is utilized for drying the incoming crushed oil shale as it moves gravitationally from the inlet end 7 downwardly through the transfer passage 13 in the elongated housing or recovery tower 10. The spent combustion gases will be vented to atmosphere. Any suitable means can be provided to reduce any harmful effect to the environment that might be caused by venting these combustion gases to the local atmosphere surrounding the retort apparatus and system in accordance with the present invention.

The addition of the heat which is supplied to the crushed oil shale moving through the cracking and distillation zone will raise the temperature of the crushed oil shale to the critical temperature required to decompose the organic matter or kerogen therein. This will cause the hydrocarbons to separate from the organic matter or kerogen and in accordance with the present invention a suitable separation means is provided for this purpose.

Thus referring to FIGS. 1, 2, 5, 6, 7 and 8 the retort or hydrocarbon recovery zone is shown to include a plurality of serially disposed vent members which are mounted in the elongated housing 10 transversely of the transfer passage 13 at 90° to the horizontal line of the heat exchanger tubes 27a to 27d in the respective upper and lower sections of the cracking and distillation zone and in alternate levels therewith as is shown in FIGS. 1, 5, 6 and 7 of the drawings.

The vent members 61a to 61h are U-shaped in cross-section and when connected in the housing are disposed to have the open end of the U inverted to face in a downward direction so that by normal expansion the hydrocarbon vapors will collect and enter the open mouth end of the U-shaped vent members 61a to 61f.

Figure 6:
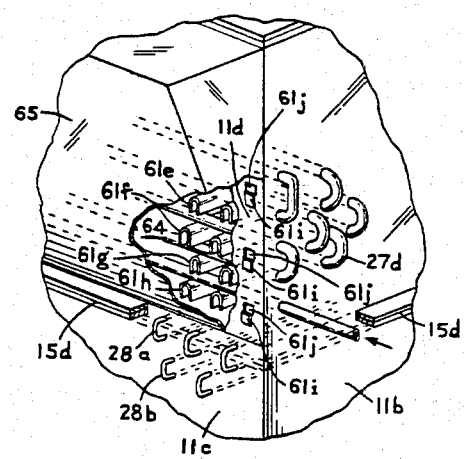
FIG. 6 is an enlarged fragmentary perspective view of the lower portion of the cracking and distillation shown in FIGS. 2 and 5 showing the heat exchange members and the U-shaped venting members.
Figure 7:
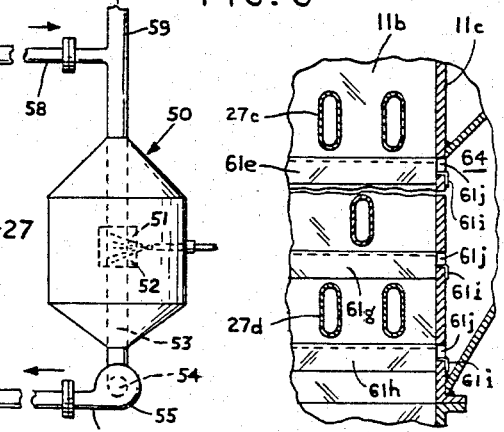
FIG. 7 is a fragmentary view of some of the heat exchange tubes and the transverse U-shaped venting members for evacuating the hydrocarbon vapors from the cracking and distillation zone.
Figure 8:
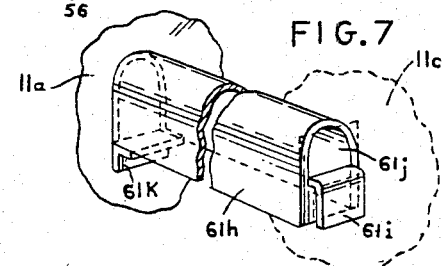
FIG. 8 is an enlarged view of one of the U-shaped venting members for evacuating hydrocarbon vapors from the cracking and distillation zone.

The U-shaped vent members 61a through 61h are connected at one end by bracket members 61i on each of the vent members to the lower edge of the openings 61j formed in the side wall 11c and by a support bracket 61k on the inner face of the side wall 11a so that the lower half of the U-shaped vent members 61a to 61h are blocked off and only the upper half communicates through the opening formed as at 61*i* thereon with the opening 61*j* in the side wall 11*c* so that each of the U-shaped vent members 61*a*, 61*b*, 61*c* and 61*d* communicate with the upper chamber 62 formed in the upper hydrocarbon collecting manifold 63 and each of the U-shaped vent members 61*e*, 61*f*, 61*g* and 61*h* communicate with the lower chamber 64 formed in the lower hydrocarbon collecting manifold 65 all of which is shown in FIGS. 6, 7 and 8 of the drawings.

The blocking off of the lower half of the inverted U-shaped vent members acts to prevent fines, particles or dust from the gravitationally moving crushed oil shale from rising up through the mouth of and into the inverted U-shaped vent members and therefore does not interfere with the free movement and collecting of the hydrocarbon vapors and other gases drawn by the hydrocarbon collecting manifolds 63 and 65. This also prevents contamination of these collected vapors and gases by the fines, dust and particles that may be present in the crushed oil shale.

The upper collecting manifold 63 and lower collecting manifold 65 in turn communicate through the respective connecting conduits 66 and 67 with the suction inlets respectively at 68 and 69 on the vacuum pumps 70 and 71 so that a suitable vacuum pressure may be maintained in the cracking and distillation zone 27 during the operation of the retort apparatus and system in accordance with the present invention.

The discharge outlets 72 and 73 of the vacuum pumps 70 and 71 communicate respectively through connecting pipes 74 and 75 to a common delivery manifold 76 which delivers the hydrocarbon vapors and other gases to the condenser 77 where the hydrocarbon vapors are condensed and discharged through drain 78 to a suitable point of storage, not shown, and the uncondensed gases are vented through a vent line 79 to a suitable point of collection or use as the case may be.

Since the elongated housing or recovery tower 10 is open to atmosphere at the respective upper or inlet end 7 and the lower or outlet end 20, those skilled in the art will readily recognize that the separated and vaporized mixture of hydrocarbon and gases formed in the intermediate cracking and distillation zone 27 must be protected from contact with oxygen in the atmosphere on the one hand and the environment must be protected from the pollution that would be caused by leakage of this mixture of hydrocarbon and other gases.

This is accomplished in the present invention by controlling the relative pressure in the transfer passage 13 on opposite sides of the cracking and distillation zone 27 as the crushed oil shale moves from the upper or inlet end 7 to the lower or outlet end 20 of the transfer passage 13.

Thus by reference to FIG. 1, the separation zone is shown to include control louvers as at 81 and 82 in the respective connecting passages of the conduits 66 and 67 which communicate with the respective suction inlets 68 and 69 of the pumps 70 and 71.

The operation of these pumps is controlled by the respective controllers as at 83 for the control louver 81, and at 84 for the control louver 82. Controllers 83 and 84 are operable responsive to an upper sensing means 85 for controlling louver 81 as a function of the pressure at a point between the drying zone 25 and preheat zone 26 and a lower sensing means 86 which actuates the controller 84 as a function of the change in pressure at a predetermined point in the waste heat recovery zone spaced from the discharge outlet 20 of the elongated housing or recovery tower 10.

The sensing mechanism 87 on the upper sensing means 85 will be set to maintain a pressure in the elongated housing or recovery tower 10 just above atmospheric pressure so as to prevent any mixture of air from leaking or flowing towards the intermediate cracking and distillation zone 27. Similarly the sensing mechanism 88 on the lower sensing means 86 will be set above atmospheric pressure so as to prevent any air from leaking inwardly from the discharge outlet 20 into the waste heat recovery zone. As an example, an approximate measure of atmospheric pressure at 6000 feet above sea level is a level of 275" in a water column. The pressures in the zones surrounding the cracking and distillation zone may be maintained at a pressure equivalent to $275\frac{1}{2}$" in a water column.

The vacuum pumps 70 and 71 will be operated at a pressure substantially above atmospheric pressure because of the volume of gases which are produced in the cracking and distillation zone and the control louvers 81 and 82 will be so actuated by the control means above described that they will maintain a pressure above atmospheric pressure and above the pressures sensed by sensing mechanisms 87 and 88 in the cracking and distillation zone at all times when the retort apparatus and system in accordance with the present invention is in operation. For example, the pressure in the cracking and distillation zone may be equivalent to 276" in a water column.

In the event that there is any leakage of the hydrocarbon and gas mixture from the cracking and distillation zone, the same will flow upwardly through the elongated housing or recovery tower 10 into the space 90. The moisture separated from the drying section and miscellaneous loose fines will pass upwardly through the connecting passage 91 to a vent condenser 92 where the moisture will be condensed and the non-condensible gases, the fines, dust, etc. will be vented through the vent 93 to atmosphere. The water obtained by condensing the moisture is sprayed on the spent shale exiting from the apparatus to prevent dust storms.

In the present invention it is necessary to also facilitate movement of the crushed oil shale through the elongated housing or recovery tower 10 from the inlet end of the recovery tower 10 to the outlet end thereof.

Attention is therefore particularly called to FIG. 1 of the drawings which shows that the fins 93 on tubes 25*a*, 25*b*, etc. in the drying zone 25; the fins 94 on the tubes 26*h* and 26*i* in the preheating zone 26, and the fins 95 on the tubes 28*a*, 28*b*, etc. in the waste heat recovery zone 28 are in substantial alignment with each other in assembled position.

This construction when coupled with the non-finned heat exchanger tubes 27*a*, 27*b*, etc. in the cracking and distillation zone 27, the relatively slippery or low friction characteristic of the crushed oil shale, and the operation of the system under anaerobic conditions enables the crushed oil shale to slide or sift with relative ease through the recovery tower 10 on movment of the outlet control assembly 20 in intimate heat exchange relation with the finned and non-finned tubing so that the heat will be conductively transferred substantially uniformly through the packed mass of the crushed oil shale as it moves through the recovery tower 10.

The fins on the finned tubes in the drying zone, preheat zone and waste heat recovery zone are aligned and generally spaced in the horizontal plane approximately 1″ from each other.

Finned tubes are used in the drying zone 25, preheat zone 26 and waste heat recovery zone 28 because the heat exchange medium is a liquid, non-finned and oval shaped tubes are used in the cracking and distillation zone 27 because the heat exchange medium is a gas. The use of finned and non-finned oval tubes in this manner increases the heat exchange efficiency of the apparatus and process in accordance with the present invention.

Further in regard to facilitating movement of the crushed oil shale thorough the elongated housing or recovery tower 10, this apparatus provides a relatively simple visual inspection test to determine whether the crushed oil shale is flowing with relative freedom through the elongated housing or recovery tower 10. Thus, because of the outlet port member 17 and the outlet ports 17a, 17b, 17c etc. when the outlet control assembly is moved to open position, the operator can visually observe whether the crushed oil shale is discharging uniformly from the outlet control assembly by the size and shape of the piles of crushed oil shale delivered onto the conveyor belt 23a.

In the event that the outlet control assembly 20 indicates non-uniform delivery of the spent crushed oil shale from the elongated housing or recovery tower 10, any suitable convenient device such as a vibrating mechanism, not shown, or elongated agitating rods extending end to end through the tower, not shown, may be used to relieve any local portion in the mass of moving crushed oil shale where undue compression or clogging has occurred.

The construction of the vent members and the operation of the system will be such that it will avoid an excessive pressure drop and while the vent members 61a, 61b, 61c, etc. are shown as opening on only one side of the elongated housing or recovery tower 10, those skilled in the art will readily recognize that the vent members could open on opposite sides of the recovery tower 10 and by suitable manifolding passed to the common collecting ducts 62 and 63 so as to provide the required drawing off of recovered hydrocarbon vapors to provide a proper balance and pressure drop in this area of the system.

OPERATION

In operation, with the outlet control assembly 20 in the closed position, the crushed oil shale is delivered from the hopper 1 by the screw conveyor 5 to the inlet 7 of the transfer passage 13 in the elongated housing 10 until the entire transfer passage 13 is completely filled with the crushed oil shale from the inlet 7 to the outlet 16 thereof.

The auxiliary heating assembly 50 is now placed into operation by igniting the oil or gas burner 61 and combustion gases will be passed by the blower 55 to the respective lower and upper sections of the cracking and distillation zone 27. The combustion gases passing through the heat exchange tubes 27a to 27e will raise the temperature of the crushed oil shale sufficiently to cause decomposition of the organic matter or kerogen in the crushed oil shale so as to release hydrocarbon vapors and other gases therefrom.

The separation system 60 is placed into operation by turning on the vacuum pumps 70 and 71 and the hydrocarbon vapor and other gases will be drawn from the cracking and distillation zone to the collecting chamber 62 and 64 through the U-shaped vent members in communication therewith. The released and recovered hydrocarbon vapors and other gases will be pumped by the vacuum pumps 70 and 71 through the connecting lines 74 and 75 to the common return or delivery line 76 into the condenser 77 where the hydrocarbon vapors and other gases will be condensed and passed to storage through the drain line 78, as soon as condensing occurs and hydrocarbons are being recovered. The timer 22e and motor 22d are turned on to actuate the outlet control assembly 20 and this will commence the gravitational movement of the crushed oil shale at an approximate rate of about 1′ per minute through the transfer passage 13.

As the crushed oil shale begins to move through the transfer passage 13, the conveyor 5 will simultaneously be turned on to deliver crushed oil shale to the inlet end 7 of the transfer passage. The control units 8 and 9 will operate to pass the crushed oil shale into the inlet end 7 of the transfer passage 13 so that it is uniformly distributed across the transverse cross-section of the elongated transfer passage 13. The operation of the conveyor 5 will automatically coordinate with the outlet control assembly 20 which is operated as a function of the rate of recovery of hydrocarbon vapors from the cracking and distillation zone 27.

As the hydrocarbon vapors and other gases are pumped from the cracking and distillation zone 27 the control louvers 81 and 82 which will be normally open will be slowly moved to a position by the controllers 83 and 84 which will correspond to the predetermined pressure sensed by the sensing mechanisms 87 and 88 in the respective heat zones and waste heat recovery zones of the elongated housing or recovery tower 10 such that the pressures therein will continue to be maintained at pressures above atmospheric pressure at a point such that little or no leakage of the hydrocarbon vapors or other gases will occur through the respective preheat zones and waste heat recovery zones of the elongated housing or recovery tower 10.

Thus the operation of the system will continue substantially free of any atmospheric oxygen with the dangers that might occur by reason thereof.

It will be understood that the invention is not to be limited to the specific construction or arrangement of parts shown but that they may be widely modified within the invention defined by the claims.

What is claimed is:

1. A method of recovering hydrocarbons from oil shale including the steps of:
   a. crushing said oil shale to an approximate predetermined size,
   b. delivering said oil shale to an elongated housing for controlled movement through a transfer passage extending end to end therethrough.
   c. moving the crushed oil shale through a drying zone in the transfer passage and heating the same within a first temperature range.
   d. moving the crushed oil shale from the drying zone to a preheating zone in the transfer passage which follows the drying zone and heating the same within a second temperature range higher than said first temperature range,
   e. moving the crushed oil shale through a cracking and distillation zone in the transfer passage which follows the preheating zone and heating the crushed oil shale in said cracking and distillation zone within a third temperature range higher than said second temperature range and to a temperature above the critical temperature for releasing hydrocarbon in vapor form from the crusher oil shale, f. separating the hydrocarbon vapors from the crushed oil shale therein by pump means, g. condensing the hydrocarbon vapors and passing the same to any suitable point of storage, h. moving the crushed oil shale from the cracking and distillation zone to a waste heat recovery zone in the transfer passage which follows the cracking and distillation zone to recover waste heat from the spent crushed oil shale and utilizing the recovered waste heat for preheating the incoming crushed oil shale.

i. removing the spent oil shale from the transfer passage in the elongated housing, j. sensing the pressure within said elongated housing on opposite sides of said cracking and distillation zone, and k. adjusting the pressure in said cracking and distillation zone by regulating the pump means in response to the sensed pressures to a pressure greater than the pressures in the other zones such that substantially all hydrocarbon vapors are separated by said pump means and such that gases in said adjacent zones do not enter into said cracking and distillation zone.

2. The method of recovering hydrocarbon from oil shale as claimed in claim 1; wherein the oil shale is ground so as to have a predetermined size not in excess of one of $\frac{3}{4}''$ and 300 mesh.

3. The method of recovering hydrocarbon from oil shale as claimed in claim 1; wherein said step of adjusting includes the steps of:

a. maintaining a first predetermined pressure above atmospheric pressure in the moving crushed oil shale as it is passed through the preheating zone, b. maintaining a second predetermined pressure above atmospheric pressure in the moving crushed oil shale during the passage through the waste heat recovery zone, c. and maintaining a third predetermined pressure in the cracking and distillation zone above said first and second predetermined pressures as a function of the first predetermined pressure and second predetermined pressure.

4. The method of recovering hydrocarbon from oil shale as claimed in claim 3; wherein said step of adjusting includes the steps of regulating said pump means in response to said first and second predetermined pressures to maintain said third predetermined pressure.

5. The method of recovering hydrocarbon from oil shale as claimed in claim 1; wherein the step of moving the crushed oil shale through said drying zone and heating the same includes the step of supplying heat to the crushed oil shale therein by passing a heated fluid through at least one heat exchanger tube at least partly positioned within said drying zone.

6. The method of recovering hydrocarbon from oil shale as claimed in claim 5; wherein the step of moving the crushed oil shale through said cracking and distillation zone and heating the same includes the step of supplying heat to the crushed oil shale therein by passing a heated fluid through at least one heat exchanger tube positioned within said cracking and distillation zone.

7. The method of recovering hydrocarbon from oil shale as claimed in claim 6; further including the step of passing heated fluid exiting from said at least one heat exchanger tube in said cracking and distillation zone across a portion of said at least one heat exchanger tube in said drying zone which extends from said drying zone to heat fluid in the latter.

8. The method of recovering hydrocarbon from oil shale as claimed in claim 1; wherein said step of moving the crushed oil shale from the cracking and distillation zone to said waste heat recovery zone and utilizing the recovered waste heat includes the step of passing fluid between at least one heat exchanger tube positioned within said preheating zone and at least one heat exchanger tube positioned within said waste heat recovery zone in a closed path.

* * * * *